(12) United States Patent
Wang

(10) Patent No.: US 7,505,037 B2
(45) Date of Patent: Mar. 17, 2009

(54) DIRECT VOLUME RENDERING OF 4D DEFORMABLE VOLUME IMAGES

(75) Inventor: Bai Wang, Palo Alto, CA (US)

(73) Assignee: Accuray, Inc., Sunnyvale, CA (US)

( * ) Notice: Subject to any disclaimer, the term of this patent is extended or adjusted under 35 U.S.C. 154(b) by 547 days.

(21) Appl. No.: 11/095,223

(22) Filed: Mar. 31, 2005

(65) Prior Publication Data

US 2006/0072821 A1      Apr. 6, 2006

Related U.S. Application Data

(60) Provisional application No. 60/615,007, filed on Oct. 2, 2004.

(51) Int. Cl.
  *G06T 17/00* (2006.01)
(52) U.S. Cl. ..................................... 345/424
(58) Field of Classification Search ........................ None
  See application file for complete search history.

(56) References Cited

U.S. PATENT DOCUMENTS

| 5,601,084 A | 2/1997 | Sheehan et al. |
| 5,889,524 A | 3/1999 | Sheehan et al. |
| 6,295,464 B1 | 9/2001 | Metaxas |
| 2004/0081340 A1* | 4/2004 | Hashimoto .................. 382/128 |

OTHER PUBLICATIONS

Oliveira, J., Zhang, D., Buxton, B., Spanlang, B., Animating Scanned Human Models, 2003, Journal of WSCG, vol. 11, No. 1, pp. 1-8.*

Coste-Maniere, E, et al., "Robotic Whole Body Stereotactic Radiosurgery: Clinical Advantages of the CyberKnife® Integrated System", Int J Medical Robotics and Computer Assisted Surgery 2005, 2005 Robotic Publications Ltd.

Engel, Klaus, et al., "High-Quality Pre-Integrated Volume Rendering Using Hardware-Accelerated Pixel Shading", Visualization and Interactive Group, University of Stuttgart, Germany (9 pages).

Hesser, Jorgen, et al., "Three Architectures for Volume Rendering", Eurographics '95, vol. 14, No. 3, Blackwell Publishers, 1995 (1 page).

Levoy, Marc, et al., "Volume Rendering in Radiation Treatment Planning" Proc. 1st Conference Bisualization in Biomedical Computing, IEEE CS Press, 1990, pp. 4-10.

(Continued)

*Primary Examiner*—Said Broome
(74) *Attorney, Agent, or Firm*—Blakely, Sokoloff, Taylor & Zafman LLP

(57) ABSTRACT

A method and system are presented for direct volume rendering of a deformable volume dataset that represent an object in motion. An original 3D image dataset of the object is acquired at an initial stage of the motion, and segmented. Deformed 3D image datasets of the object are acquired at subsequent stages of the motion. Deformation matrices are computed between the segmented original 3D image dataset and the deformed 3D image datasets. A plurality of deformed mesh patches are generated based on the deformation matrices. 2D textures are generated by dynamically sampling the segmented 3D image dataset, and applied to the deformed mesh patches. The textured deformed mesh patches are evaluated, blended, and composited to generate one or more volume-rendered images of the object in motion.

37 Claims, 2 Drawing Sheets

OTHER PUBLICATIONS

Pawasauskas, John, "Volume Visualization With Ray Casting", CS563—Advanced Topics in Computer Graphics, Feb. 18, 1997 (15 pages) http://web.cs.wpi.edu/~matt/courses/cs563/talks/powwie/p1/ray-casr.htm, accessed Apr. 16, 2007.

Westermann, Rudiger, et al., "Efficiently Using Graphics Hardware in Volume Rendering Applications", In Proc of SIGGRAPH Computer Graphics Conference Series, 1998, Computer Graphics Group, Universitat Erlangen-Nurnberg, Germany (9 pages).

PCT International Preliminary Report on Patentability (Chapter I of the Patent Cooperation Treaty), PCT/US2005/030141 filed Aug. 22, 2005, mailed Apr. 12, 2007.

PCT Written Opinion of the International Searching Authority, PCT/US05/30141 filed Aug. 22, 2005, mailed Feb. 20, 2007.

PCT International Search Report, PCT/US05/30141 filed Aug. 22, 2005, mailed Feb. 20, 2007.

* cited by examiner

US 7,505,037 B2

DIRECT VOLUME RENDERING OF 4D DEFORMABLE VOLUME IMAGES

CROSS-REFERENCE TO RELATED APPLICATIONS

This application claims the benefit of priority under 35 U.S.C. §119(e) from co-pending, commonly owned U.S. provisional patent application Ser. No. 60/615,007, entitled "Direct Volume Rendering of 4D Deformable Volume Images," and filed on Oct. 2, 2004. The provisional application Ser. No. 60/615,007 is incorporated herein by reference in its entirety.

TECHNICAL FIELD

Embodiments of the present invention relate to the field of volumetric image rendering, and in particular, to the rendering of a four-dimensional deformable volume representing an object in motion.

BACKGROUND

Volume rendering may allow three-dimensional (3D) volumetric data to be visualized. Volumetric data may consist of a 3D array of voxels, each voxel characterized by an intensity value which may typically pertain to color and opacity. Each voxel may be assigned a color (e.g., one of R (red), G (green), and B (blue)) and an opacity, and a 2D projection of the volumetric data may be computed. Using volume rendering techniques, a viewable 2D image may be derived from the 3D volumetric data.

Volume rendering may have been widely used in many applications to derive a viewable 2D image from 3D volumetric data of an object, e.g. a target region within a patient's anatomy. In some medical applications such as radiosurgery, an anatomical target region that moves, due to e.g. heartbeat or breathing of the patient, may need to be tracked. In these cases, a volume rendered animation of periodic motions such as respiration and heartbeat may be desirable.

A 3D volume dataset which varies over time may be considered to be a 4D deformable volume image. A number of methods may be used for volume rendering of 4D deformable volume images. These methods may involve one or more of the following approaches: representing a deformable volume using tetrahedrons that have freedom to move in 3D space; using a marching cube algorithm to convert volume rendering to surface rendering by finding small iso-surfaces in non-structural data; representing the volumetric dataset with a procedural mathematical function; and using a multiple volume switching method, in which all the intermediate volumes are generated before rendering.

Many of these approaches may tend to be very time-consuming, and some of them may require extra memory. Some of these approaches may be difficult to implement for medical images. Also, with some of these approaches, it may be hard to obtain smooth transitions between stages.

SUMMARY

An apparatus for direct volume rendering of a 4D deformable volume image representing an object in motion may include a data acquisition subsystem, a segmentation subsystem, and a deformation matrix generator. The apparatus may further include a mesh patch generator, a texture subsystem, an evaluator, and a compositor. The data acquisition subsystem may be configured to acquire an original 3D image dataset of the object, and a plurality of deformed 3D image datasets of the object. The segmentation subsystem may be configured to segment the original 3D image dataset to identify one or more volumes of interest from the dataset. The deformation matrix generator may be configured to compute deformation matrices between the segmented original 3D image dataset and the plurality of deformed 3D image dataset.

The mesh patch generator may be configured to generate deformed mesh patches for the deformation matrices. The texture subsystem may be configured to dynamically sample the segmented original 3D image dataset to generate a plurality of sampled slices having textures. The texture subsystem may be further configured to apply the textures to the deformed mesh patches. The evaluator may be configured to resample the deformed mesh patches and the textures applied thereto. The compositor may be configured to blend and composite the resampled deformed mesh patches to generate a volume-rendered image of the object in motion.

An apparatus for direct volume rendering of a 4D deformable volume image representing an object in motion may include a data acquisition subsystem and a data processing system. The data acquisition subsystem may be configured to acquire an original 3D image dataset of the object, and a plurality of deformed 3D image datasets of the object. The data processing system may be configured to process the original 3D image dataset and the deformed 3D image datasets.

The data processing system may be configured to segment the original 3D image dataset and to generate textures by dynamically sampling the segmented original 3D image dataset. The data processing system may be further configured to compute deformation matrices between the segmented original 3D volumetric dataset and the deformed 3D image datasets, and to generate deformed mesh patches for the deformation matrices. The data processing system may be further configured to resample, blend, and composite the plurality of textured deformed mesh patches, to generate a volume rendered image of the object.

A method of volume rendering a deformable volume dataset representative of an object in motion may include acquiring an original 3D image dataset of the object, and segmenting the original 3D image dataset to identify one or more volumes of interest from the dataset. The method may further include acquiring a plurality of deformed 3D image datasets of the object, and computing deformation matrices between the original 3D image dataset and the deformed 3D image datasets. The method may further include generating a plurality of deformed mesh patches for the deformation matrices. The method may further include generating a plurality of 2D textures by dynamically sampling the segmented 3D image dataset, and applying the 2D textures to the deformed mesh patches. The method may further include evaluating, blending and compositing the textured deformed mesh patches to generate one or more volume-rendered images of the object in motion.

An apparatus for direct volume rendering of a 4D deformable volume representing an object in motion may include a data processing system configured to process an original 3D image dataset representative of the object at an initial stage of the motion of the object, and a plurality of deformed 3D image datasets representative of the object at a corresponding plurality of successive stages of the motion of the object to generate one or more volume-rendered images of the object.

The data processing system may be configured to segment the original 3D image dataset, to generate textures by dynamically sampling the segmented original 3D image dataset; to compute deformation matrices between the segmented original 3D volumetric dataset and the deformed 3D image datasets, to generate deformed mesh patches for the deformation matrices, and to resample, blend, and composite the plurality of textured deformed mesh patches to generate a volume rendered image of the object.

DETAILED DESCRIPTION

A method and system are presented in which direct volume rendering is applied to 4D deformable volume images of an object undergoing motion. The method and system may not require any pre-processing steps, and allow for smooth transitions between the stages of the motion of the object. The volumetric datasets may be dynamically filtered, and dynamic resolution support may be provided for the volume rendering process.

The method and system described below may also be used in radiotherapy. The term radiotherapy may refer to a procedure in which radiation is applied to a target region for therapeutic, rather than necrotic, purposes. The amount of radiation utilized in radiotherapy may typically be about an order of magnitude smaller, as compared to the amount used in radiosurgery. Radiotherapy may frequently be used to treat early stage, curable cancers. In addition to delivering radiation to cancerous tissue, radiotherapy systems may generally also irradiate a certain amount of normal tissue surrounding the tumor. Typically, a series of relatively small doses may be delivered over a number of days. Each radiation dose may create some collateral damage to healthy surrounding tissue, which however may usually heal by itself, because it may have a greater ability to repair, compared to cancerous tissue. For convenience, the term "radiosurgery" in this patent shall henceforth mean "radiosurgery and/or radiotherapy."

Figure 1:
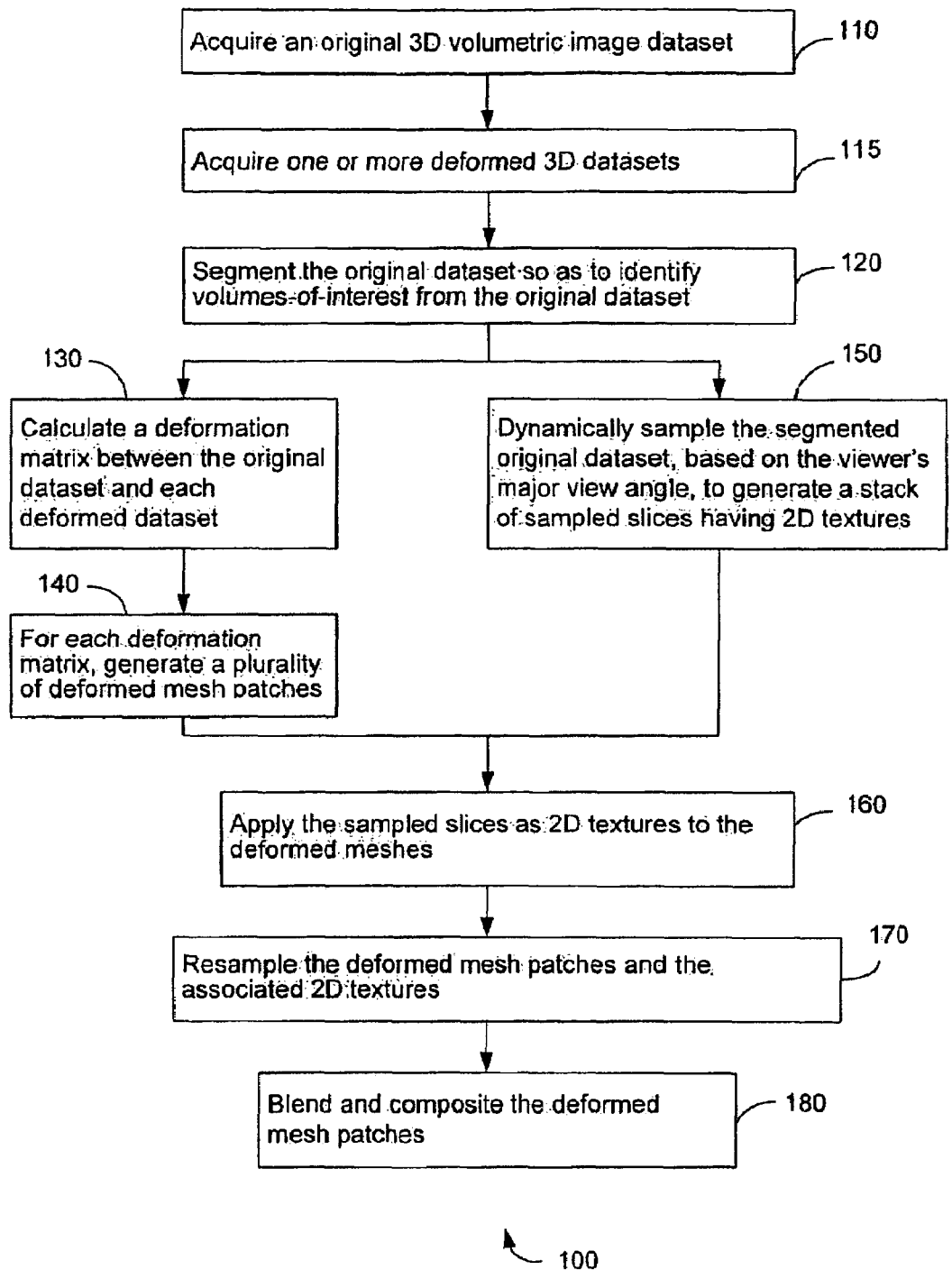
FIG. 1 illustrates a schematic flow chart illustrating a method of directly rendering a 4D deformable volume image, i.e. a 3D volume dataset which varies over time.

FIG. 1 illustrates a schematic flow chart illustrating a method 100 of directly rendering a 4D deformable volume image, which may be a 3D volume dataset which varies over time. In overview, the method may include acquiring an original dataset of the object, and a plurality of deformed datasets; segmenting the original dataset, so as to identify volumes-of-interest from the original dataset; generating a plurality of deformed mesh patches for each deformed dataset; dynamically sampling the segmented original dataset, to generate a stack of sampled slices having 2D textures; applying the sampled slices as 2D textures to the deformed mesh patches; evaluating the deformed mesh patches and the associated 2D textures, and sorting the mesh patches back to front; and finally blending together and compositing the mesh patches to generate the desired volume-rendered 2D image.

The initial step 110 may be data acquisition. During step 100, an original 3D volumetric image dataset may be acquired of an object that is undergoing motion. This act may take place at a given stage of the motion, e.g. an initial stage of the motion that takes place at a time point $t_0$. In an exemplary embodiment, the object may be an anatomical region of a patient, although the method and system described below may also be applicable to objects other than anatomical regions. The motion may be a substantially periodic motion, for example respiration or heartbeat of a patient. It should be understood, of course, that the method and system described in this section may also be applied to motions that are not substantially periodic. For example, $t_0$ may be a peak or a trough of a respiratory cycle of a patient. The object may be an anatomical region that is undergoing respiratory motion due to the breathing of the patient, by way of example. A number of methods may be used to generate the 3D image datasets. These methods may include, but are not limited to, CT (computed tomography); MRI (magnetic resonance imaging); PET (positron emission tomography); and 3D ultrasound imaging.

One or more additional deformed 3D volumetric image datasets may then be acquired in step 115. The deformed 3D volumetric image datasets may be acquired at each of a corresponding of time points $t_1, t_2, \ldots t_N$, throughout the motion. Each additional dataset may correspond to a 3D volumetric image taken at a corresponding different stage of the motion. For convenience, the initial dataset will be referred to in this patent as the "original dataset" in the description below, and each additional dataset will be referred to as a "deformed dataset." Each deformed dataset may thus represent a corresponding different stage in the motion of the object. The plurality N of deformed 3D image datasets, together with the original 3D image dataset, may provide a set of 3D volumetric images representative of the object in motion.

After the data acquisition steps 110 and 115, the original 3D dataset may be segmented, in step 120. During segmentation, one or more volumes-of-interest may be identified from the original 3D volumetric dataset. Segmentation may refer to a process of identifying and demarcating volumes of interest from a 3D volumetric data set. In step 120, only the original 3D image dataset, which was acquired at time t0, is segmented. No other dataset, including the deformed 3D image datasets representative of subsequent stages of the motion of the object, are segmented.

In 3D medical applications, for example, the volumes of interest may be internal organs of a patient, contained within an anatomical region of the patient. Segmentation may allow these internal organs to be visualized, by converting the segmented organs into models which may be rendered using graphics software. Segmentation may be performed using a number of techniques. These techniques include, but are not limited to, the following: applying simple thresholds to the 3D volume; applying adaptive thresholds; and drawing contours on the slices of the object being imaged. Any known segmentation method and algorithm may be used. Either manual, and/or automatic, and/or semi-automatic methods of segmentation may be applied to the original dataset during the segmentation step 120.

The result of the segmentation may be saved as a segmented or a filtered original 3D dataset. Typically, the filtered dataset may be an RGBA dataset, where RGB refers to the conventional red, green, and blue color intensity information, and A refers to the opacity intensity. The RGBA color/opacity information may be stored, and may be used to represent each voxel in the filtered dataset.

The volumes of interest, identified through the segmentation step 120, may be directly embedded into the filtered original dataset. By incorporating the volumes of interest into the original dataset, dataset integrity may be maintained during the deformation process. By embedding the volumes of interest (obtained through segmentation) in the filtered original dataset, the deformed volume of interest information may be generated directly by resampling.

In step 130, a deformation matrix may be calculated between the original 3D image dataset and each deformed 3D image dataset. A separate deformation matrix may be computed for each of the plurality of deformed 3D image datasets, i.e. two or more deformation matrices may be calculated if more than two deformed volumetric image datasets have been acquired during step 115. Since each deformed dataset represents a different stage in the motion of the object, each of the two or more deformation matrices may represent a different stage in the motion of the object. The deformation may be a function that defines, in 3D space, a relationship between a voxel in the original dataset space with the corresponding voxel in the deformed dataset space. The deformation matrix may be represented with a number of different techniques, including but not limited to B-splines or Fourier transforms.

B-splines may be used to generate a single piecewise polynomial curve through any desired number of control points, and may be mathematically defined as:

$$P(t) = \sum_{i=1}^{n+1} N_{i,k}(t)P_i \qquad \text{Eq. (1)}$$

where $P_I$ (i=1, . . . , n+1) represent n+1 control points, and $N_{i,k}(t)$ represent basis functions of order k, and degree k−1. For B-splines, the order of the curve (e.g., a first order curve being a linear curve, a second order curve being a quadratic curve, and a third order curve being a cubic curve, etc.) is not dependent on the number of control points, unlike Bézier curves. B-splines may provide building blocks for any polynomial splines that have equally spaced knots, since such polynomials may be uniquely characterized in terms of a B-spline expansion. B-splines, which may be the shortest possible polynomial splines, may be defined as piecewise polynomials $\beta^n(x)$ of degree n, as follows:

$$\beta^0(x) = 1, \text{ if } |x| < 0.5 \qquad \text{Eq. (2)}$$
$$0.5, \text{ if } |x| = 0.5$$
$$0, \text{ otherwise,}$$

and $$\beta^n(x) = 1/n! \sum_{k=0}^{n+1}\left(\binom{n+1}{k}(-1)^k\left(x-k+\frac{n+1}{2}\right)_+^n\right) \qquad \text{Eq. (3)}$$

where $$x_+^n = x^n, \text{ if } x \geq 0$$
$$0, \text{ if } x < 0$$

As readily seen from the equations above, $\beta^0(x)$ represents a rectangular pulse, and $\beta^n(x)$ represents an (n+1)-fold convolution of the rectangular pulse $\beta^0(x)$.

In the next step 140, a plurality of deformed mesh patches may be generated, for each deformation matrix calculated in step 130. The deformed mesh patches may be calculated based on the deformation matrix. In an exemplary embodiment, a two-step approach may be implemented for computing the deformed mesh patches. First, a control point array may be calculated, based on the deformation matrix; second, deformed meshes may be calculated based on the control point array, by using two-dimensional evaluators.

The two-step approach may be viewed as using two protocols to define the deformed mesh patches. During the first protocol, the mesh patch is defined based on deformation matrix computed for each stage. During the second protocol, the mesh patch is interpolated based on the deformed mesh patches for two neighboring stages. The interpolation process allows for smoother transitions between stages of the animation.

In one embodiment, the deformed mesh patches may be 2D Bézier surfaces, with N×N control points, and may be obtained by mathematically computing the Bézier surfaces. A Bézier surface S(u, v), where u and v vary from one edge of a surface to the other, may defined by a set of "control points" (X(i,j), Y(i,j), Z(i,j)) for i=0 to n, and j=0 to m. Unlike B-splines, for Bézier surfaces the order of the curve may be dependent on the number of control points. The mathematical definition of a Bézier surface patch may be given by:

$$S(u, v) = \sum_{i=0}^{n} \sum_{j=0}^{m} B_i^n(u)B_j^m(v)P_{ij} \qquad \text{Eq. (4)}$$

where $P_{ij}$ are a set of m×n control points, and the $B_i$ are Bernstein polynomials. $P_{ij}$ may represent, for example, vertices, normals, colors, or texture coordinates.

A Bernstein polynomial of degree n (or order n+1) may be given by $$B_i^n(u) = \binom{n}{i}u^i(1-u)^{n-i}. \qquad \text{Eq. (5)}$$

If $P_i$ represents a set of control points (which may be one-, two-, three-, or even four-dimensional control points), then the equation $$C(u) = \sum_{i=0}^{n} B_i^n(u)P_i \qquad \text{Eq. (6)}$$

may be a Bézier curve, as u varies from 0.0 to 1.0. To represent the same curve but allowing u to vary between $u_1$ and $u_2$ instead of 0.0 and 1.0, the following coefficient should be evaluated:

$$C\left(\frac{u-u_1}{u_2-u_1}\right) \qquad \text{Eq. (7)}$$

To save memory, the deformed mesh patches may be slice based, and may be generated on the fly based on the major view angle. If the major view angle is along Z-axis, the axial slice may be used. If major view angle is along Y-axis, the coronal slice may be used. If major view angle is along X-axis, the sagittal slice may be used.

Deformed mesh patches may be dynamically defined, with different resolutions, to better fit performance and quality balance. The precision or resolution of the interpolation may depend on the desired number of intervals between different stages. The number N of control points for the Bézier surface patches that are generated as deformed mesh patches may represent the mesh resolution of the mesh patches. In one embodiment, N may be about 17, i.e. 17×17 control point mesh patches may empirically be found to be sufficient for rendering the deformable slice.

In the next step 150, the segmented original 3D image dataset (segmentation for which was performed in step 120)

may be dynamically sampled, to generate a stack of sampled slices having 2D textures. In this process, each slice may become a texture, i.e. a 2D image or picture. The dynamic sampling may be performed based on the viewer's major view angle.

In one embodiment, the sampling may be performed based on the viewer's major view angle. In one embodiment, the axial slice is used for a Z-axis major view angle, the coronal slice is used for a Y-axis major view angle, and the sagittal slice is used for a X-axis major view angle, by analogy to step 140. It is to be understood, of course, sampling performed with choices of different slices for the respective view angles is within the scope of the present patent application. Sampling may be done by tri-linear interpolation. The tri-linear interpolation may degenerate to bi-linear interpolation, if sampling plane is perpendicular to one of major axes.

Texture based algorithms may render the data as a stack of textured slices, from back to front. Each 2D texture may be a 2D image, containing RGB (red, green, and blue) and A (opacity) components. Texture based algorithms may use the fact that modern graphics hardware have the capacity of drawing textured polygons, so that such capacity can be exploited in 3D graphics to avoid constructing complex geometric models.

In general, volume rendering using 2D textures may involve generating 2D textures from the volumetric image data, then selecting the desired number of slices and the desired viewpoint and view direction. Data slice polygons may then be generated, for example parallel to the chosen 2D texture set. Each data slice may be rendered as a textured polygon, from back to front. A blend operation may be performed at each slice, before the final composition process. As the viewpoint and direction of view changes, the data slice positions may be recomputed, and the texture transformation matrices may be updates as necessary. The 2D textures generated from the volumetric image data may be three sets of 2D textures, oriented perpendicular to one of the three axes (typically x-, y-, and z-) that define the volumetric data.

In the method 100 shown in FIG. 1, the sampled slices may be applied to the deformed meshes, as 2D textures, in step 160. In this step, the sampled slices may be created with multiple 2D textures, which may be applied to the deformed mesh patches so that each 2D texture becomes associated with a corresponding deformed mesh patch.

In step 170, the deformed mesh patches, together with the associated 2D textures, may be evaluated in the graphics card hardware, i.e. may be resampled. Two-dimensional evaluators may be used, for example. The deformed mesh patches may then be sorted based on the view direction back to front (far to near) order.

The final step 180 may involve blending and composition of the mesh patches, during which the multiple deformed mesh patches are blended and composited, using suitable blending functions and/or compositing functions. The final blending and compositing step may also be performed in the graphics card hardware.

In the method 100 described above, the volumes of interest, identified and defined in the segmentation step 120 and thereafter embedded into the filtered original dataset, are sampled along with image datasets. The deformed volume rendering results may therefore contain both the volumes of interest, and the medical image data.

Using the method 100 described above, the memory required to render volumes may be minimized. The memory load may contain the original dataset or the filtered dataset, and three N×N deformed mesh patches, where N represents the mesh resolution, as explained earlier.

The method 100 described above may not require preprocessing, nor require multiple segmentations of the same volume. This feature may save huge amounts of time for the user. Embedding a volume of interest into the original dataset may maintain dataset integrity during the deformation process. Also, no extra memory may be required. Therefore, in theory any desired number of intermediate steps may be generated for smoother transitions between stages.

Further, this method may allow for dynamic filtering and intensity based segmentation during the rendering process. With full graphics hardware support, real-time rendering may be possible. This method may support dynamic resolution settings for rendering and interpolation. The user may choose the desired performance and image quality by making these settings.

Figure 2:
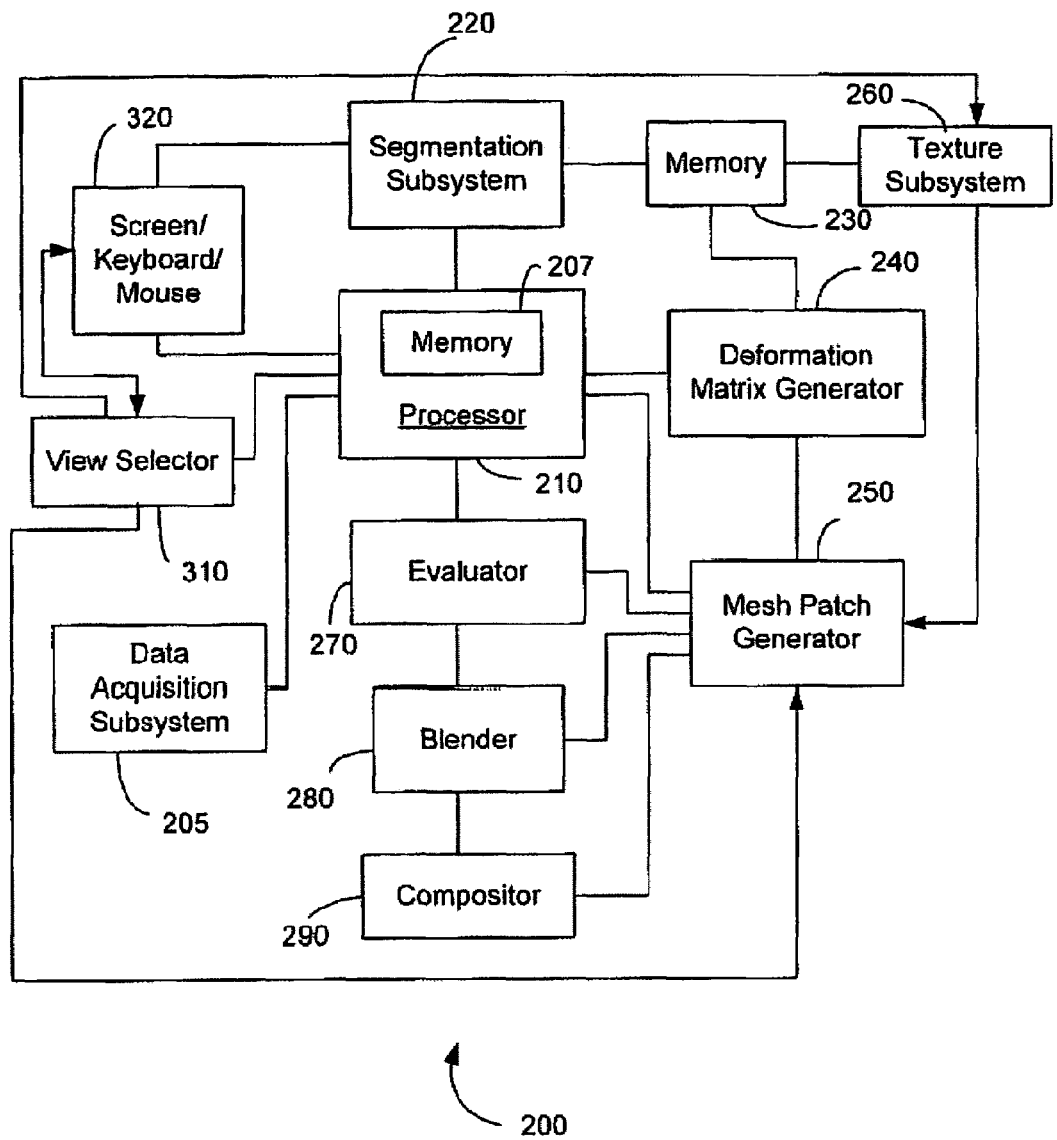
FIG. 2 illustrates a schematic block diagram of a system for directly rendering a 4D deformable volume image, i.e. a 3D volume dataset which varies over time.

FIG. 2 illustrates a schematic block diagram of an apparatus for direct volume rendering of a 4D deformable volume image, i.e. a 3D volume dataset which varies over time. In overview, the apparatus 200 may include a data acquisition subsystem 205; a segmentation subsystem 220; a deformation matrix generator 240; a mesh patch generator 250; a texture subsystem 260; an evaluator 270; a blender 280; and a compositor 290. The apparatus 200 may include a central processor 210 that controls all the subsystems of the direct volume rendering system 200.

The data acquisition subsystem 205 may be configured to acquire the original 3D image dataset and a plurality of deformed 3D image datasets. The original 3D image dataset and the deformed 3D image datasets may be one or more of a CT (computerized tomography) volumetric dataset; an MRI (magnetic resonance imaging) volumetric dataset; and a PET (positron emission tomography) volumetric dataset.

As explained earlier, the original 3D image dataset and the plurality of deformed 3D image datasets may each represent a stage in the motion of the object. The data acquisition subsystem may be configured to acquire the original 3D image dataset at a time point $t_0$ representative of an initial stage in the motion of the object, and to acquire the plurality of deformed 3D image datasets at subsequent time points $t_1$, $t_2$, ..., $t_N$ representative of respective subsequent stages in the motion of the object. The data acquisition subsystem 205 may store the original and deformed datasets in a first memory 207.

A segmentation subsystem 220 may be configured to segment the original dataset stored in the memory 207, so as to identify one or more volumes of interest from the original dataset. The segmentation subsystem 220 may embed the identified volumes of interest directly in the segmented original dataset. The segmented or filtered original dataset may be stored in another memory, indicated in FIG. 2 with reference numeral 230.

A deformation matrix generator 240 computes a deformation matrix between the filtered original dataset, stored in the memory 230, and each deformed dataset, stored in the memory 207. As explained earlier, a deformation matrix between the original 3D image dataset and a deformed 3D image dataset may define a relationship between a voxel in the original 3D image dataset and a corresponding voxel in the deformed 3D image dataset, in 3D space. As explained earlier, the deformation matrix may be represented by at least one of a B-splines function $\beta^n(x)$ (n=0, 1, ..., n, ...), and a Fourier transform, where the B-splines function $\beta^n(x)$ (n=0, 1, ..., n, ...) may be defined using equations (1), (2), and (3) above.

The mesh patch generator 250 may generate a plurality of deformed mesh patches, for each deformation matrix calculated by the deformation matrix generator 240. The deformed mesh patches may be characterized by a resolution N. Each of the deformed mesh patches generated by the mesh patch generator may be a Bézier surface having N×N control points. N may be about 17. The Bézier surface may be defined mathematically using equations (4), (5), (6), and (7) above.

The deformed mesh patches generated by the mesh patch generator 250 may comprise slice-based deformed mesh patches. The mesh patch generator may be configured to generate the deformed mesh patches based on a major view angle. The locations of the voxels of the segmented original 3D image dataset and of the deformed 3D image datasets may be defined by reference to mutually perpendicular x-, y-, and z-axes. The deformed mesh patches may be based on an axial slice when the major view angle is along the z-axis. The deformed mesh patches may be based on a coronal slice when the major view angle is along the y-axis. The deformed mesh patches may be based on a sagittal slice when the major view angle is along the x-axis.

The mesh patch generator 250 may be configured to define the deformed mesh patches based on a single deformation matrix at a given stage of the motion of the object. Alternatively, the mesh patch generator 250 may be configured to define the deformed mesh patches by interpolating between two deformation matrices at their respective stages of the motion of the object.

A texture subsystem 260 may dynamically sample the segmented original dataset, stored in the memory 230, to generate a stack of sampled slices having textures. The textures may be 2D textures. The texture subsystem 260 may perform the sampling based on the viewer's major view angle. A view selector 310 may receive user inputs, for example through an I/O device such as the screen/keyboard/mouse unit 320, to select a desired view angle. The processor 210 may then cause the texture subsystem 260 to sample the segmented original dataset based on the view angle selected by the user.

In an embodiment in which the locations of the voxels of the segmented original 3D image dataset are described by reference to the major axes (i.e. the mutually perpendicular x-, y-, and z- axes), the sampled slices generated by the texture subsystem 260 may be axial slices when a major view angle is selected along the z-axis. The sampled slices generated by the texture subsystem 260 may be coronal slices when a major view angle is selected along the y-axis. The sampled slices generated by the texture subsystem 260 may be sagittal slices when a major view angle is selected along the x-axis.

The texture subsystem 260 may then apply the sampled slices as 2D textures to the deformed mesh patches generated by the mesh patch generator 250, i.e. may assign to each deformed mesh patch a corresponding 2D texture. The texture subsystem 260 may be sample the segmented original 3D image dataset by tri-linear interpolation, which may degenerate into bi-linear interpolation if the sampling plane is perpendicular to one of the major axes.

The evaluator 270 may evaluate the deformed mesh patches and the associated 2D textures, i.e. resample the deformed mesh patches and associated 2D textures. Finally, the blender 280 may blend the plurality of deformed mesh patches using a suitable blending function known in the art, and the compositor 290 may composite the plurality of deformed mesh patches, to generate the desired volume rendered image.

In sum, a method and system for rendering deformable volumes has been described, based on dynamically sampling volume datasets, and applying the filtered slices as a 2D texture to deformed meshes. Deformed meshes with texture maps may be used directly, with graphics hardware. Volumes need only be segmented in the original dataset. Resampling may obtain information about the deformed volume of interest directly. The deformation meshes may be dynamically defined with different resolutions, to better fit performance and quality balance. The only memory requirements for rendering and animating deformable volumes may be the original filtered dataset, and three N×N deformed mesh patches, where the default value for N may be about 17.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for direct volume rendering of a 4D deformable volume representing an object in motion, comprising:
    a data acquisition subsystem configured to acquire an original 3D image dataset of the object, and a plurality of deformed 3D image datasets of the object; a segmentation subsystem configured to segment the original 3D image dataset to identify one or more volumes of interest from the dataset;
    a deformation matrix generator configured to compute deformation matrices between the segmented original 3D image dataset and the plurality of deformed 3D image datasets;
    a mesh patch generator configured to generate deformed mesh patches for the deformation matrices;
    a texture subsystem configured to dynamically sample the segmented original 3D image dataset to generate a plurality of sampled slices having textures, the texture subsystem further configured to apply the textures to the deformed mesh patches; an evaluator configured to resample the deformed mesh patches and the applied textures, wherein the texture subsystem is further configured to sample the segmented original 3D image dataset based on a major view angle; and
    a compositor configured to composite the resampled deformed mesh patches to generate a volume-rendered image of the object in motion.

2. The apparatus of claim 1 wherein the original 3D image dataset and the plurality of deformed 3D image datasets each represent a stage in the motion of the object, and wherein the data acquisition subsystem is further configured to acquire the original 3D image dataset at a time point to representative of an initial stage in the motion of the object, and wherein the data acquisition subsystem is further configured to acquire the plurality of deformed 3D image datasets at subsequent time points $t_1, t_2, \ldots, t_N$ representative of respective subsequent stages in the motion of the object.

3. The apparatus of claim 1 wherein the segmentation subsystem is further configured to embed the identified volumes of interest within the segmented original 3D image dataset, so that the texture subsystem samples the volumes of interest together with the 3D image dataset.

4. The apparatus of claim 1 wherein the textures comprise 2D textures.

5. The apparatus of claim 1, wherein the texture subsystem further comprises a view selector configured to select a desired major view angle in response to input by a viewer.

6. The apparatus of claim 5, further comprising a blender configured to blend the resampled deformed mesh patches and to sort the blended deformed mesh patches in a back-to-front order along a resampling view direction.

7. The apparatus of claim 5, wherein the locations of the voxels of the segmented original 3D image dataset are described by reference to mutually perpendicular x-, y-, and z- axes, wherein the sampled slices comprise axial slices when a major view angle is selected along the z-axis, wherein the sampled slices comprise coronal slices when a major view angle is selected along the y-axis, and wherein the sampled slices comprise sagittal slices when a major view angle is selected along the x-axis.

8. The apparatus of claim 1, wherein the texture subsystem is further configured to sample the segmented original 3D image dataset by one of tri-linear interpolation and bi-linear interpolation.

9. The apparatus of claim 1, wherein the original 3D image dataset and the plurality of deformed 3D image datasets each comprise a plurality of voxels, each voxel characterized by an intensity value of a corresponding volume element of the object, and wherein the intensity value of each voxel represents a color and an opacity of the volume element corresponding to the voxel.

10. The apparatus of claim 9, wherein the intensity value relating to color comprises one of a red color value, a green color value, and a blue color value.

11. The apparatus of claim 1, wherein a deformation matrix between the original 3D image dataset and a deformed 3D image dataset defines a relationship between a voxel in the original 3D image dataset and a corresponding voxel in the deformed 3D image dataset, in 3D space.

12. The apparatus of claim 1, wherein the original 3D image dataset and the deformed 3D image datasets comprise at least one of: a CT (computerized tomography) volumetric dataset; an MRI (magnetic resonance imaging) volumetric dataset; a PET (positron emission tomography) volumetric dataset; and a 3D ultrasound volumetric dataset.

13. The apparatus of claim 1, wherein the segmentation subsystem comprises at least one of: a manual segmentation subsystem; an automatic segmentation subsystem; and a semi-automatic segmentation subsystem.

14. The apparatus of claim 1, wherein the deformed mesh patches are characterized by a resolution N, wherein each of the deformed mesh patches generated by the mesh patch generator comprises a Bezier surface having N×N control points, wherein N is a number of control points, and wherein the Bezier surface is defined mathematically in two dimensions defined by u- and v-axes by:

$$S(u, v) = \sum_{i=0}^{n} \sum_{j=0}^{m} B_i^n(u) B_j^m(v) P_{ij}$$

where $P_{ij}$ represent a number m*n of control points, m and n are dimensions defining a total number of control points, i and j are index variables identifying the control points, and $B_i$ represent Bernstein polynomials.

15. The apparatus of claim 1, wherein the deformed mesh patches comprise slice-based deformed mesh patches, and wherein the mesh patch generator is configured to generate the deformed mesh patches based on a major view angle.

16. The apparatus of claim 15, wherein the locations of the voxels of the segmented original 3D image dataset and of the deformed 3D image datasets are described by reference to mutually perpendicular x-, y-, and z-axes, wherein the deformed mesh patches are based on an axial slice when the major view angle is along the z-axis, wherein the deformed mesh patches are based on a coronal slice when the major view angle is along the y-axis, and wherein the deformed mesh patches are based on a sagittal slice when the major view angle is along the x-axis.

17. The apparatus of claim 1, wherein the mesh patch generator is configured to define the deformed mesh patches based on one deformation matrix at its stage of the motion of the object.

18. The apparatus of claim 1, wherein the mesh patch generator is configured to define the deformed mesh patches by interpolating between two deformation matrices at their respective stages of the motion of the object.

19. The apparatus of claim 1, wherein the motion of the object comprises a periodic motion characterized by a periodic cycle, wherein the time point to is representative of one of a peak and a trough of the periodic cycle, and wherein the periodic motion comprises one of a respiration and a heartbeat.

20. The apparatus of claim 1, wherein the evaluator is further configured to sort the resampled deformed mesh patches in a back-to-front order, along a resampling view direction.

21. An apparatus for direct volume rendering of a 4D deformable volume representing an object in motion, comprising:
 a data acquisition subsystem configured to acquire an original 3D image dataset of the object, and a plurality of deformed 3D image datasets of the object; a segmentation subsystem configured to segment the original 3D image dataset to identify one or more volumes of interest from the dataset;
 a deformation matrix generator configured to compute deformation matrices between the segmented original 3D image dataset and the plurality of deformed 3D image datasets;
 a mesh patch generator configured to generate deformed mesh patches for the deformation matrices;
 a texture subsystem configured to dynamically sample the segmented original 3D image dataset to generate a plurality of sampled slices having textures, the texture subsystem further configured to apply the textures to the deformed mesh patches; an evaluator configured to resample the deformed mesh patches and the applied textures; and a compositor configured to composite the resampled deformed mesh patches to generate a volume-rendered image of the object in motion, wherein the original 3D image dataset and the plurality of deformed 3D image datasets each comprise a plurality of voxels, each voxel characterized by an intensity value of a corresponding volume element of the object, and wherein the intensity value of each voxel represents a color and an opacity of the volume element corresponding to the voxel, wherein the intensity value relating to color comprises one of a red color value, a green color value, and a blue color value, and wherein the deformation matrix is represented by at least one of a B-splines function $\beta^n(x)(n=0, 1, \ldots, n, \ldots)$, and a Fourier transform, wherein the B-splines function is an (n+1) fold convolution of a rectangular pulse, $\beta^0(x)$, wherein n represents a degree of the B-splines function $\beta^n(x)$, x represents a position along a curve defined by the B-splines function, k represents an order of a basis function of the B-splines function, and wherein, $\beta^0(x)$ and $\beta^n(x)$ are given by:

$$\beta^0(x) = 1, \quad \text{if } |x| < 0.5$$
$$0.5, \quad \text{if } |x| = 0.5$$
$$0, \quad \text{otherwise,}$$

and $$\beta^n(x) = 1/n! \sum_{k=0}^{n+1} \left( \binom{n+1}{k} (-1)^k \left(x - k + \frac{n+1}{2}\right)^n_+ \right)$$

where $$x^n_+ = x^n \text{ if } x \geq 0$$
$$0, \quad \text{if } x < 0.$$

22. A method of volume rendering a deformable volume dataset representative of an object in motion, comprising:

acquiring an original 3D image dataset of the object, and segmenting the original 3D image dataset to identify one or more volumes of interest from the dataset;

acquiring a plurality of deformed 3D image datasets of the object, and computing deformation matrices between the original 3D image dataset and the deformed 3D image datasets;

generating a plurality of deformed mesh patches based on the deformation matrices; generating a plurality of 2D textures by dynamically sampling the segmented 3D image dataset using the processor, and applying the 2D textures to the deformed mesh patches; and evaluating, blending and compositing the textured deformed mesh patches to generate one or more volume-rendered images of the object in motion, wherein the act of computing the deformation matrices comprises defining in 3D space a relationship between each voxel in the original 3D dataset, and its corresponding voxel in the deformed 3D dataset, wherein defining the relationship comprises computing one of a Fourier transform and a B-splines function $\beta^n(x)$ (n=0, . . . , n, (n+1), . . .), wherein n represents a degree of the B-splines function $\beta^n(x)$, x represents a position along a curve defined by the B-splines function, k represents an order of a basis function of the B-splines function, and wherein a mathematical definition of $\beta^0(x)$ and $\beta^n(x)$ comprises:

$$\beta^0(x) = 1, \quad \text{if } |x| < 0.5$$
$$0.5, \quad \text{if } |x| = 0.5$$
$$0, \quad \text{otherwise,}$$

and $$\beta^n(x) = 1/n! \sum_{k=0}^{n+1} \left( \binom{n+1}{k} (-1)^k \left(x - k + \frac{n+1}{2}\right)^n_+ \right)$$

where $$x^n_+ = x^n, \quad \text{if } x \geq 0$$
$$0, \quad \text{if } x < 0.$$

23. A method of volume rendering a deformable volume dataset representative of an object in motion, comprising:

acquiring an original 3D image dataset of the object, and segmenting the original 3D image dataset to identify one or more volumes of interest from the dataset;

acquiring a plurality of deformed 3D image datasets of the object, and computing deformation matrices between the original 3D image dataset and the deformed 3D image datasets;

generating a plurality of deformed mesh patches based on the deformation matrices; generating a plurality of 2D textures by dynamically sampling the segmented 3D image dataset using the processor, and applying the 2D textures to the deformed mesh patches; and evaluating, blending and compositing the textured deformed mesh patches to generate one or more volume-rendered images of the object in motion, wherein the act of dynamically sampling the segmented original 3D image dataset comprises selecting a desired major view angle in response to input by the user, and sampling the segmented original 3D image dataset based on the selected major view angle.

24. The method of claim 23, wherein the 3D image dataset comprises a plurality of voxels, each voxel characterized by an intensity value of a corresponding volume element of the object, and wherein the intensity value of each voxel represents a color and an opacity of the volume element corresponding to the voxel.

25. The method of claim 24, wherein the intensity value relating to color comprises one of a red color value, a green color value, and a blue color value.

26. The method of claim 23, wherein the act of dynamically sampling the segmented dataset comprises sampling the segmented dataset based on a major view angle of a viewer.

27. The method of claim 23, further comprising the act of directly embedding the one or more volumes-of-interest into the segmented original 3D image dataset.

28. The method of claim 23, wherein each deformed 3D volumetric dataset is representative of a stage in the motion of the object.

29. The method of claim 28, wherein the original 3D image dataset is acquired at a time point to representative of an initial stage in the motion of the object, and wherein the plurality of deformed 3D image datasets are acquired at subsequent time points $t_1, t_2, \ldots, t_N$ representative of respective subsequent stages in the motion of the object.

30. The method of claim 23, wherein the act of generating the deformed mesh patches comprises generating a Bezier surface.

31. The method of claim 23, wherein the act of sampling the segmented original 3D image dataset comprises sampling the identified volumes of interest together with the original 3D image dataset.

32. The method of claim 23, wherein the act of dynamically sampling the segmented original 3D image dataset comprises performing one of tri-linear interpolation and bi-linear interpolation.

33. The method of claim 23, wherein the act of generating the plurality of deformed mesh patches comprises generating the deformed mesh patches based on a major view angle, and based on one or more slices.

34. The method of claim 23, wherein the act of generating the plurality of deformed mesh patches comprises defining the deformed mesh patches based on a deformation matrix between stages in the motion of the object.

35. The method of claim 23, wherein the act of generating the plurality of deformed mesh patches comprises interpolating between two deformation matrices at their stages in the motion of the object.

36. The method of claim 23, wherein the acts of acquiring the original 3D image dataset and the plurality of deformed 3D image datasets comprises performing one of CT (computerized tomography) scanning, MRI (magnetic resonance imaging) scanning, PET (positron emission tomography) scanning, and 3D ultrasound imaging.

37. The method of claim 23, wherein the act of evaluating the textured deformed mesh patches comprises resampling the deformed mesh patches and the textures applied to the deformed mesh patches, and sorting the resampled deformed mesh patches in a back-to-front order along a resampling view direction.

* * * * *